US012747042B2

(12) United States Patent
Desch

(10) Patent No.: US 12,747,042 B2
(45) Date of Patent: Sep. 29, 2026

(54) DRONE

(71) Applicant: Andreas Desch, Zell an der Pram (AT)

(72) Inventor: Andreas Desch, Zell an der Pram (AT)

( * ) Notice: Subject to any disclaimer, the term of this patent is extended or adjusted under 35 U.S.C. 154(b) by 0 days.

(21) Appl. No.: 18/874,308

(22) PCT Filed: Jun. 13, 2023

(86) PCT No.: PCT/EP2023/065815
§ 371 (c)(1),
(2) Date: Apr. 28, 2025

(87) PCT Pub. No.: WO2023/242198
PCT Pub. Date: Dec. 21, 2023

(65) Prior Publication Data

US 2025/0368363 A1 Dec. 4, 2025

(30) Foreign Application Priority Data

Jun. 13, 2022 (AT) .............................. A 50413/2022

(51) Int. Cl.
*B64U 30/293* (2023.01)
*B64U 10/13* (2023.01)
(Continued)

(52) U.S. Cl.
CPC ........... *B64U 30/293* (2023.01); *B64U 10/13* (2023.01); *B64U 30/24* (2023.01); *B64U 60/40* (2023.01); *B64U 2101/15* (2023.01)

(58) Field of Classification Search
CPC ..... B64U 60/40; B64U 2101/18; B64U 30/24
See application file for complete search history.

(56) References Cited

U.S. PATENT DOCUMENTS 9,981,744 B2 * 5/2018 Choo .................. B64C 29/0025
11,649,051 B2 * 5/2023 Arlton .................... B64U 30/21
244/17.23

(Continued)

FOREIGN PATENT DOCUMENTS

CN 106347651 B 7/2018
CN 108275264 A 7/2018

(Continued)

OTHER PUBLICATIONS

International Application No. PCT/EP2023/065815, International Search Report and Written Opinion mailed Sep. 4, 2023, 18 pages.

(Continued)

*Primary Examiner* — Joshua D Huson
(74) *Attorney, Agent, or Firm* — Liang & Hennessey LLP; Brian Hennessey

(57) ABSTRACT

A drone including a body and a rotor unit, the body has a substantially cylindrical outer lateral surface, and at least one energy storage element of the drone is arranged in the body. The rotor unit is connected to a head side of the body, and the rotor unit comprises a first rotor with first blades and a second rotor with second blades, wherein the first rotor and the second rotor are arranged coaxially to each other, the first rotor is designed to rotate clockwise about a rotational axis, and the second rotor is designed to rotate counterclockwise about the rotational axis. The first blades and the second blades are mounted such that they can be freely folded so that they rest against the body in a rotation-free state.

13 Claims, 3 Drawing Sheets

(51) Int. Cl.

| | |
|---|---|
| ***B64U 30/24*** | (2023.01) |
| ***B64U 60/40*** | (2023.01) |
| ***B64U 101/15*** | (2023.01) |

(56) References Cited

U.S. PATENT DOCUMENTS

| | | | | |
|---|---|---|---|---|
| 2005/0051667 | A1 | 3/2005 | Arlton et al. | |
| 2017/0284371 | A1 | 10/2017 | Gamble et al. | |
| 2018/0057161 | A1 * | 3/2018 | Groninga | B64C 27/24 |
| 2018/0101169 | A1 | 4/2018 | Applewhite | |
| 2018/0118334 | A1 | 5/2018 | Stamps et al. | |
| 2019/0176983 | A1 | 6/2019 | Darnell | |

FOREIGN PATENT DOCUMENTS

| | | | |
|---|---|---|---|
| CN | 110481769 | A | 11/2019 |
| CN | 113942635 | A | 1/2022 |
| EP | 3218263 | B1 | 3/2022 |

OTHER PUBLICATIONS

Austrian Application No. A 501413/2022, Office Action mailed Apr. 26, 2023, 3 pages.

* cited by examiner

DRONE

CROSS-REFERENCE TO RELATED APPLICATIONS

The present application is a national phase application of PCT Application No. PCT/EP2023/065815, filed Jun. 13, 2023, entitled “DRONE”, which claims the benefit of Austrian Patent Application No. A 50413/2022, filed Jun. 13, 2022, each of which is incorporated by reference in its entirety.

BACKGROUND OF THE INVENTION

1. Field of the Invention

The invention relates to a drone.

2. Description of the Related Art

Unmanned aerial vehicles are referred to as drones. Drones usually have multiple, typically four to eight, rotors, and a majority of the drones currently in use also have at least one camera for motion picture recording or videos. Such drones are able to take off automatically, to change their position or geographical coordinates by flying on the basis of their propulsion, but also to hover and essentially maintain their position. Such drones are used by many users as toys or for hobby purposes. However, they are also used professionally for filming, for example at sporting events.

Although such drones are technically suitable for filming mass human events, for example, their usefulness is limited due to certain technical characteristics. These well-known drones fly automatically into the area in which they are to take pictures and—due to their spatial extent—are recognizable and conspicuous in the sky. These characteristics are completely irrelevant, for example, when filming a competition taking place during the Olympic Games, as everyone present is aware that they are being filmed, which is why the presence of the drone has practically no influence on the behavior of the individuals located there and that are to be filmed.

In other situations, however, the above-mentioned characteristics of such a drone are disadvantageous and lead to the influencing of objects and living beings and to changes in their behavior. This is the case, for example, when a drone is used in the natural sciences to study wild animals. The incoming drone is detected and the creatures have enough time to hide and/or change their behavior from hunting to fleeing, for example. The same happens when such drones are used in police operations. Criminals, such as smugglers and/or terrorists, can refrain from their criminal activities for a short time and possibly hide before valid footage can be captured by the drone. However, this has a more detrimental effect in the case of military use, as the drone is likely to be shot down before it has been able to carry out reconnaissance. Furthermore, known drones of this type are only suitable for field use to a limited extent, which is why they are put into operation in an environment where cleanliness is not guaranteed and where vibrations and shocks or impacts are possible. Due to their design and construction, such drones cannot be practically used in the military sector, nor can their operational capability be guaranteed. In addition, the time between recognizing the usefulness of aerial reconnaissance, the launch of the drone, its approach to the target object and the actual reconnaissance is so long that such drones can hardly be used in a tactical environment.

SUMMARY OF THE INVENTION

The object of the invention is therefore to provide a drone of the aforementioned type, with which the disadvantages mentioned can be avoided, which has a robust and stable basic structure and which can be brought to a desired target area in a short time.

According to the invention, this is achieved by the features of the claims.

Such a drone has a stable and compact basic structure. The rotors are coaxial and rotate about only one rotational axis, which is why this drone is considerably more compact than a conventional drone with four rotors, which are arranged in a square. The blades of the drone in a free, i.e. unpowered, state, are fastened in a foldable manner, which is why they rest against the body when not powered, making this drone even more compact. This also makes it easier to store and transport the drone.

This results in the further advantage that such a drone can be accelerated in a tubular container or part and can reach or fly to a target area within a short time at the speed thus achieved. The drone can be brought into the area to be observed so quickly that the time between them being noticed or recognized and their physical presence and them taking pictures or videos is too short for the target objects, i.e. animals and/or people, to change their behavior and/or position in the meantime. This means that reconnaissance can actually be carried out from the air within a short period of time after the decision to carry out reconnaissance has been taken. Animals or humans cannot hide during this short time. If the people are criminals or enemy soldiers, the probability is very low that this time is sufficient to shoot down the drone before it has carried out an optical reconnaissance. Due to its bullet-like shape, this drone is also more difficult to detect or locate in the sky than conventional drones. Due to the smaller lateral extension—compared to a so-called quadcopter—a drone according to the invention is also more difficult to hit and shoot down with a projectile.

Furthermore, the drone can be set down on the ground at a landing speed that is high enough for the drone to partially sink into the ground. This allows measurements to be carried out on the ground or in the earth which require direct contact with the ground or earth. Such measurements include seismic measurements and/or chemical measurements and/or measurements of various environmental factors. This makes the use of the drone helpful for agriculture. Furthermore, the drone can be helpful for rescue teams in the event of natural disasters and/or emergencies. Natural disasters or emergencies include, for example, fires, in particular forest fires and/or fires in fields or meadows, volcanic activity, floods, mudslides, avalanches, earthquakes, tsunamis, accidents in a factory and/or a power plant and/or a refinery.

The dependent claims relate to further advantageous embodiments of the invention.

BRIEF DESCRIPTION OF THE DRAWINGS

Express reference is hereby made to the wording of the claims, whereby the claims are incorporated by reference into the description at this point and are deemed to be reproduced verbatim. The invention is described in more detail with reference to the enclosed drawings, in which only preferred embodiments are shown by way of example. In particular:

DETAILED DESCRIPTION

Figure 1:
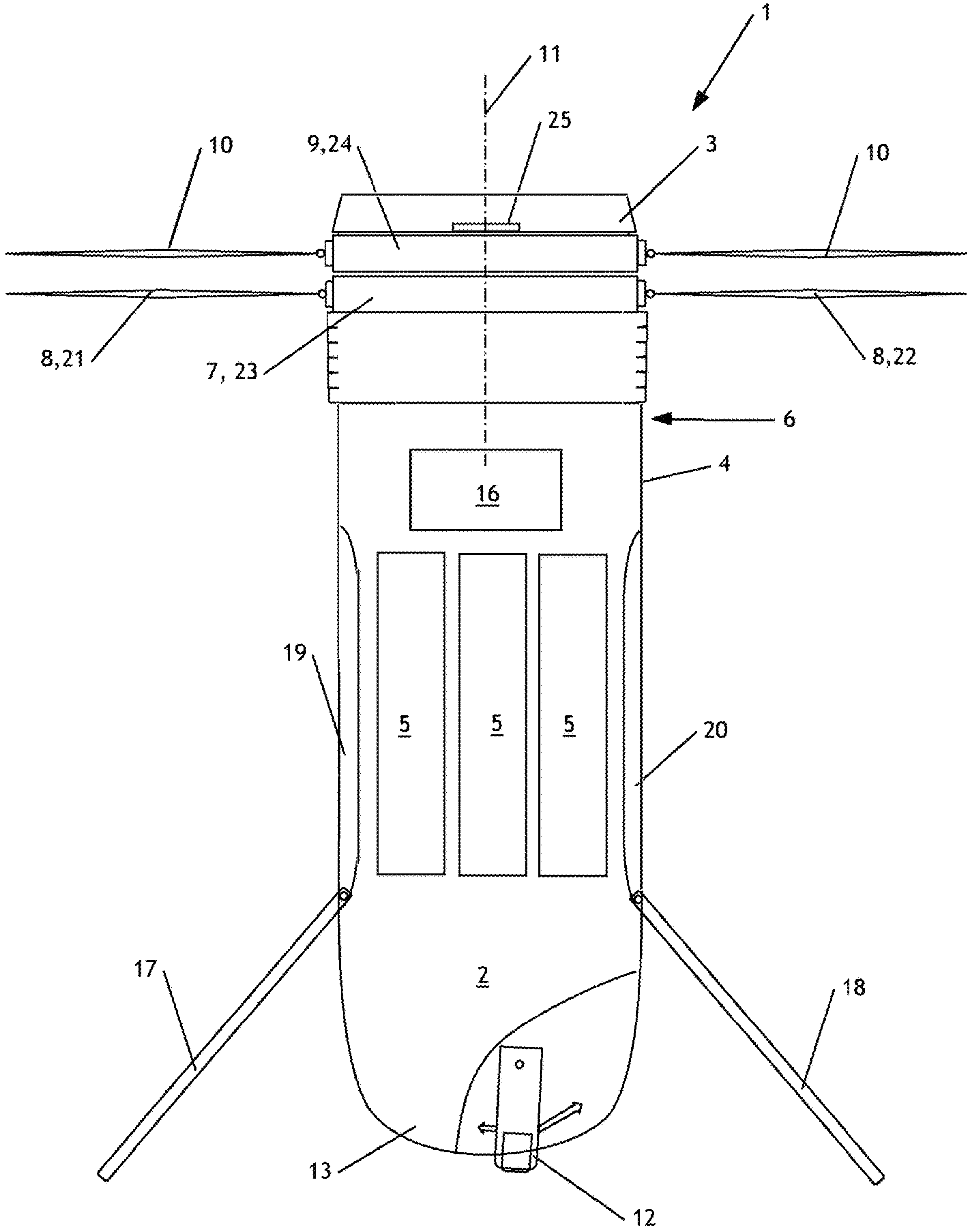
FIG. 1 shows a schematic representation of a preferred embodiment of the present drone with unfolded rotors.

FIGS. 1 to 4 show a first preferred embodiment or parts of the first preferred embodiment of a drone 1 with a body 2 and a rotor unit 3, wherein the body 2 has an essentially cylindrical outer lateral surface 4, wherein at least one energy storage element 5 of the drone 1 is arranged in the body 2, wherein the rotor unit 3 is connected to a head side 6 of the body 2, wherein the rotor unit 3 comprises a first rotor 7 with first blades 8 and a second rotor 9 with second blades 10, wherein the first rotor 7 and the second rotor 9 are arranged coaxially to one another, wherein the first rotor 7 is designed to rotate clockwise about a rotational axis 11, and wherein the second rotor 9 is designed to rotate counterclockwise about the rotational axis 11, wherein the first blades 8 and the second blades 10 are mounted such that they can be freely folded—so that they rest against the body 2 in a rotation-free state.

Such a drone 1 has a stable and compact basic structure. The rotors 7, 9 are coaxial and rotate about only one rotational axis 11, which is why this drone 1 is considerably more compact than a conventional drone with four rotors, which are arranged in a square. The blades 8, 10 of the drone 1 are arranged or fastened in a foldable manner in a free, therefore non-driven state, which is why they rest against the body 2 in the non-driven state, making this drone 1 even more compact. This also makes it easier to store and transport the drone 1.

This results in the further advantage that such a drone 1 can be accelerated in a tubular container or part and can reach or fly to a target area within a short time at the speed achieved. The drone 1 can be brought into the area to be observed so quickly that the time between it being noticed or recognized and its physical presence and its taking pictures or videos is too short for the target objects, i.e. animals and/or people, to change their behavior and/or position in the meantime. This means that aerial reconnaissance can actually be carried out within a short time after the decision to carry out reconnaissance has been made. Animals or humans cannot hide during this short time. If the people are criminals or enemy soldiers, the probability is very low that this time is sufficient to shoot down drone 1 before it has carried out an optical reconnaissance. Due to its bullet-like shape, this drone 1 is also more difficult to detect or locate in the sky than conventional drones. Due to the smaller lateral extension—compared to a so-called quadcopter—a drone 1 according to the invention is also more difficult to hit and shoot down with a projectile.

Furthermore, the drone 1 can be set down on the ground at a landing speed that is sufficiently high for the drone 1 to partially sink into the ground. This allows measurements to be carried out on the ground or in the earth which require direct contact with the ground or earth. Such measurements include, for example, seismic measurements and/or chemical measurements and/or measurements of various environmental factors. This makes the use of drone 1 helpful for agriculture. Furthermore, drone 1 can be helpful for rescue teams in the event of natural disasters and/or emergencies. Natural disasters or emergencies include, for example, fires, in particular forest fires and/or fires in fields or meadows, volcanic activity, floods, mudslides, avalanches, earthquakes, tsunamis, accidents in a factory and/or a power plant and/or a refinery.

The present invention relates to an unmanned flying object capable of flight in a gaseous atmosphere on a planet, in particular the Earth. This flight comprises stationary hovering. The term for such a flying object is a drone. In the past, flying objects with similar basic characteristics were commonly referred to as model helicopters.

The drone 1 has two basic parts, namely a body 2 and a rotor unit 3.

The body 2 has an essentially cylindrical outer lateral surface 4 or side surface. The cylindrical shape supports longitudinal movement in a channel with parallel side surfaces. The cylindrical shape comprises different cross-sections. The cross-section can be square, for example, or include curves, straight lines and corners. It is preferable for the body 2 to have an essentially circular cross-section. This supports the use of common tubes to launch the drone 1. Such common tubes are, for example, so-called grenade launchers and/or artillery cannons and/or another barrel of a firearm. However, such a tube can also be a hollow shaft of a larger machine, for example a ship's engine or a drive shaft of a truck. A correspondingly suitable tube can also be produced individually from a sufficiently large semi-finished product on a lathe, or from a sufficiently thick sheet metal by bending and riveting or welding.

It is particularly preferred that the body 2 with a circular cross-section has an outer diameter of approx. 40 mm, 80 mm, 105 mm, 125 mm and/or 155 mm. This makes it easy to launch the drone using known and common launch systems.

In addition to the lateral surface 4, the body 2 has a head area 6 and a underside 13. When viewed in the flying position, the head portion is an upper end portion of the body 2. When viewed in the flying position, the underside 13 is a lower end region of the body 2.

The primary load-bearing part of the body 2 can be made of different materials, in particular comprising aluminum alloys, brass, bronze, steel, titanium alloys, plastic compounds, GRP, AFRP, CFRP, wood. In principle, all variants known from the construction of airplanes and/or helicopters and/or spaceships and/or satellites and/or projectiles can be used. Different materials can be used to adapt to different applications and/or launch tubes.

Essential parts of the drone 1 are arranged in the body 2. At least one energy storage element 5, in particular at least one battery or at least one rechargeable battery, of the drone 1 is arranged in the body 2. Compared to the other parts of the drone 1, the energy storage element 5 has a high density and a high mass. Its positioning has a strong influence on the center of gravity of the drone 1 and is important for flight stability. The flight characteristics of the drone 1 can be influenced by changing the position of the energy storage element 5.

Preferably, the drone 1 has a control and regulation unit 16, the functional purposes and properties of which will be discussed later. This control and regulation unit 16 is also preferably arranged in the body 2 and comprises at least one µC or µP. Furthermore, the drone 1 preferably has a communication device 25, which is connected to the control and regulation unit 16 in terms of signal transmission. The communication device 25 is preferably designed as part of a radio link and, according to a first preferred embodiment, is arranged in the rotor unit 3. In particular, the communication device 25 comprises at least parts of a GPS receiver and/or a magnetometer and/or an inertial measurement system.

Figure 4:
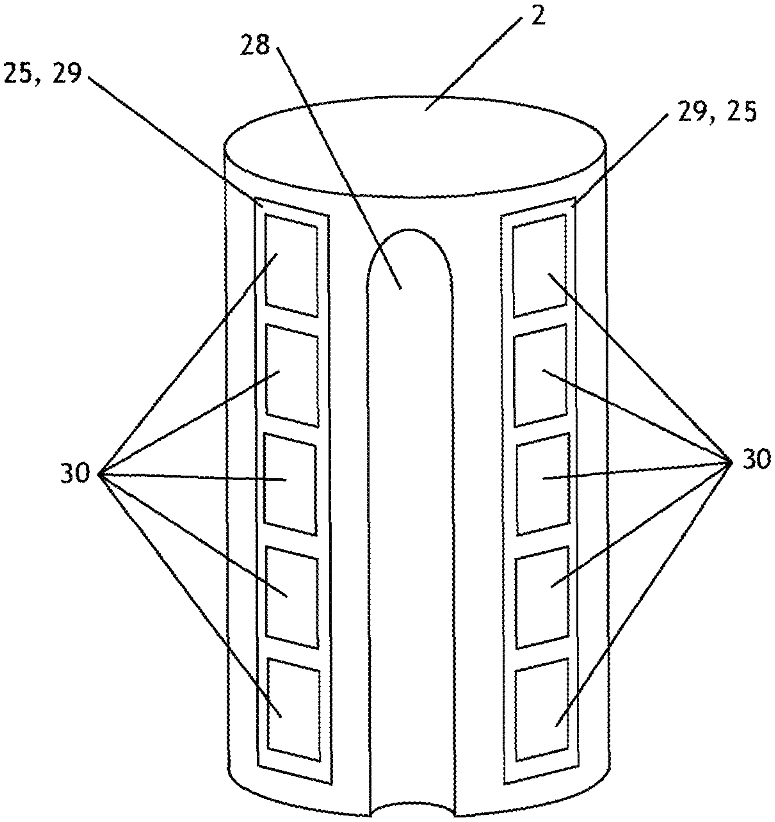
FIG. 4 shows a view of a part of a preferred embodiment of the body.

According to a second preferred embodiment, the communication device 25 comprises at least one, in particular three or four, antenna arrays 29. The individual antenna arrays 29 are arranged on a side wall of the body 2, as shown by way of example in FIG. 4. As also shown in FIG. 4, preferred recesses 28 for the individual rotor blades 21, 22 of the rotors 7, 9 are provided between the individual antenna arrays 29. An antenna array 29 has multiple, in particular at least four, preferably five, antennas 30, which together form a group. One of this plurality of antennas 30 is a passive antenna and the others are active antennas. These antennas form a system which is used for communication, in particular with other drones in a swarm, for position determination and for attitude control and steering. In particular, this enables navigation and/or position determination even without GPS signals. This takes place on the basis of a connection to a ground vehicle and to other drones in a swarm and the evaluation of the data received by means of the antenna arrays 29. This enables triangular positioning and determination of the flight altitude.

Preferably, the drone 1 is at least partially or regionally remote-controlled, and the control information is supplied to the drone 1 via the communication device 25. Furthermore, measurement data can be transmitted to the user or operator of the drone 1 via the communication device 25.

According to particularly preferred embodiments, the drone is designed to act as a data interface. In particular, it is intended that a plurality of correspondingly designed drones 1 act together and each receive, record, amplify and retransmit the data intended for another drone 1 or the user. In a preferred further development of this preferred embodiment, the plurality of drones 1 are each designed to act as a swarm. In this case, not only is data transmitted, but the flight movements of the group of drones 1 are also controlled jointly. For this purpose, the measurement signals—determined by the individual drones—are evaluated and the control or group activities of the group or pack of drones 1 are adapted to the measured environmental conditions.

As already mentioned, in addition to the body 2, the drone 1 also has a so-called rotor unit 3, which consists of at least two rotatable portions. The rotor unit 3 is mechanically connected to or fastened to the head side 6 of the body 2. In flight, the body 2 is suspended from the rotor unit 3 by its head part 6.

The rotor unit 3 comprises a first rotor 7 and a second rotor 9. According to further embodiments not shown, the rotor unit 3 can also have a larger number of rotors 7, 9, whereby both an even and an odd total number of rotors 7, 9 can be provided. The preferred total number of rotors 7, 9 is two, three, four, five, six, seven, eight, nine, ten, eleven, twelve or thirteen rotors 7, 9. However, according to the first preferred embodiment, the drone 1 has only two rotors 7, 9.

This is pointed out because many people consider at least four rotors to be a mandatory feature of a drone 1. However, this is essentially an assessment by people who are not experts in the field of aviation.

The first rotor 7 has at least two first blades 8. The second rotor 9 also has at least two second blades 10. Preferably, all rotors 7, 9 have the same number of blades 8, 10. However, it is also possible for the number of blades 8, 10 of different rotors 7, 9 to differ.

The first rotor 7 and the second rotor 9 are arranged coaxially to each other. The two rotors 7, 9 are arranged in the rotor unit 3 at a predeterminable distance from each other. The first rotor 7 is arranged or fastened to a first rotor support body 23, and the second rotor 9 is arranged or fastened to a second rotor support body 24. The first and second rotor supporting bodies 23, 24 rotate together with the respective rotors 7, 9. The two rotors 7, 9 and the two rotor supporting bodies 23, 24 have the same rotational axis 11. The two rotor support bodies 23, 24 are each rotatably mounted and spaced apart from each other to allow different movements relative to each other. However, individual roller bearings can, for example, be arranged between the two rotor supporting bodies 23, 24 in order to support force transmission without negatively influencing the rotation of the individual rotor supporting bodies 23, 24. The first rotor 7 is designed to rotate clockwise around the rotational axis 11. This direction of rotation is referred to as "clockwise". The second rotor 9 is designed to rotate counterclockwise around the rotational axis 11. This direction of rotation is referred to as "anticlockwise" or "counter-clockwise".

Although the lower rotor is shown as the first rotor 7 in the figures, this does not imply that the lower rotor is or must necessarily be designed for clockwise rotation. The two rotors 7, 9 could also be arranged in inverted positions.

If the drone 1 has more than two rotors 7, 9, it is preferable, in case of an even number of rotors 7, 9 that one half of these rotors 7, 9 rotate clockwise and the other half of the rotors 7, 9 rotate counterclockwise. In addition, however, the number of rotors 7, 9 for clockwise or counterclockwise rotation can be freely selected, but care must be taken to ensure that the resulting rotational momentum is balanced or zero.

It should be noted that a rotor 7, 9—just like a propeller—is designed for a specific direction of rotation and is constructed and manufactured accordingly. The direction of rotation, which generates lift or a lifting force or driving force, is easy to recognize on a rotor 7, 9. The blades have a profile. The term profile is to be interpreted in the sense of fluid mechanics. The profile of a blade 8, 10 of a rotor 7, 9 has a profile nose which points in the direction of movement or the direction of rotation. Furthermore, a trailing edge of the profile points in the opposite direction to the direction of rotation.

It is intended that the first blades 8 and the second blades 10 are mounted such that they are freely foldable. It is preferable for the blades 8 and 10 to lie against the body 2 in the rest position or in the rotation-free state. Alternatively, it may be provided that the blades are pre-folded in a rest position in the longitudinal direction of the drone 1. The position can be achieved, for example, by means of a pretension, for which purpose at least one spring may be provided.

The first blades 8 and the second blades 10 are fastened or mounted in such a way that they have the possibility or the ability to react to a certain application of force with a change in position. In the rotation-free state, i.e. when a rotor 7, 9 is not rotating, mainly gravity and air resistance act on the blades 8, 10 in the preferred embodiment shown in the figures. The blades 8, 10 are mounted or fastened in such a way that they can be folded, tilted or pivoted so that they can follow the force of gravity and the air resistance and are aligned in the direction of the lateral surface 4 of the body 2 or the earth by these forces. In such a rotation-free rest, the angle between a blade 8, 10 and the rotational axis 11 is essentially zero degrees when the rotational axis 11 is in the vertical direction.

As soon as a rotor 7, 9 has a rotational speed, centrifugal forces arise which act on the blades 8, 10. If the centrifugal force becomes sufficiently large, the resultant of centrifugal force, gravity, air resistance, lift and friction will "move" the blades 8, 10 and the blades 8, 10 will "unfold" away from the lateral surface 4.

The corresponding fastening of the blades 8, 10 to the rotors 7, 9 or the rotor support bodies 23, 24 is capable of permitting such a change in position, wherein in particular a tilting capability in an angular range between 0 degrees and 20 degrees relative to the rotational axis 11 is provided. In terms of design, the fastening essentially corresponds to a hinge. The rotor unit is preferably hinged at one end by means of a ball head.

Figure 3:
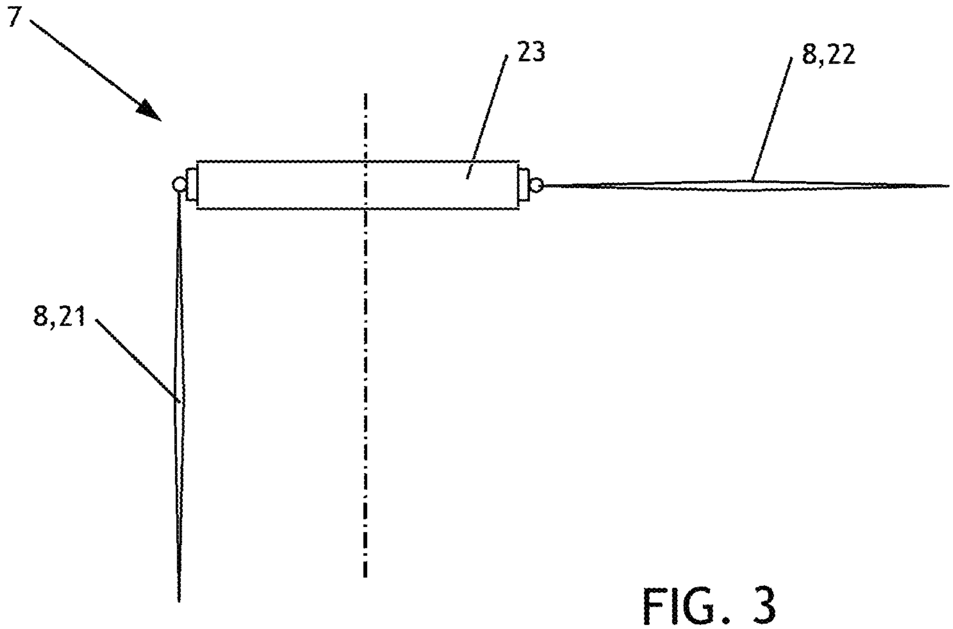
FIG. 3 shows the first rotor of the embodiment according to FIG. 1 with a first blade in the unfolded position and a second blade in a suspended position.

In addition to the described tilting capability, there is a fixed or force-transmitting connection in the other directions of rotation. FIG. 3 shows the first rotor 7 with the two first blades 8. A first of the first blades 21 is shown in the position which the blades assume in the rotation-free state of the rotor 7. A second of the first blades 22 is shown in the position which the blades assume when the rotor 7 has sufficient rotation.

The drone 1 preferably has at least one first drive motor and at least one second drive motor. The first rotor 7 is connected to the first drive motor and the second rotor 9 is connected to the second drive motor. Preferably, the first and second drive motors are each arranged in the rotor unit 3. In particular, the first drive motor is arranged in the first rotor support body 23 and the second drive motor is arranged in the second rotor support body 24. According to a further development, it is preferable for the drone to have multiple motors per rotor 7, 9. In this case, the motors that drive the first rotor 7 are arranged in a common plane in the first rotor support body 23 and drive an internal gear of the first rotor support body 23. The motors that drive the second rotor 9 are arranged accordingly in the second rotor support body 24.

The drone 1 has a control and regulation unit 16, which is preferably arranged in the body 2 and is preferably electrically connected to the energy storage element 5. The first and second drive motors, which are also electrically connected to the energy storage element 5 for energy supply, are controlled or monitored by the control and regulation unit 16. In addition to controlling the two drive motors with the aim of ensuring that both drive motors have the same speed, a targeted rotation of the drone 1 or the body 2 can be achieved by deliberately using different speeds of the first drive motor and the second drive motor.

For communication, in particular for controlling and reading out sensor data, a hollow shaft is provided in the rotor unit, which surrounds the rotational axis 11. The connecting cables between the motors and/or the communication device 25 and the control and regulation unit 16 are arranged in the hollow shaft.

As already mentioned, the rotor unit 3 is mechanically connected to the head side 6 of the body 2 or fastened to it. The rotor unit 3 is fastened at only one lateral position in a foldable way. This connection can be designed in different ways. However, it is preferable that this connection—unlike in a helicopter—does not have a swashplate or is designed without a swashplate. The angle of attack of the rotor blades 8, 10 is therefore not adjusted during a rotation. The mounting of the rotor blades 8, 10 is designed in such a way that it is not possible to change the angle of attack of the individual rotor blades 8, 10. To control the position and direction of the drone 1, the entire rotor unit is pivoted as a whole, wherein the two rotors 7, 9 are connected to each other in such a way that their position relative to each other—apart from the different direction of rotation—is not shifted and/or tilted. The position of the rotor unit 3 and the position of the mass of the body 2, which mass is essentially based on the energy storage elements 5, regulate the direction of flight. The position of the rotor unit 3 relative to the rest of the drone 1 controls the active flight of the drone 1.

According to the preferred first embodiment of the drone 1, it is provided in particular that the rotor unit 3 is connected to the head side 6 by means of at least a first actuator 14 and a second actuator. The two actuators 14 are connected to the rotor unit 3 as a whole, but not separately to the individual rotors 7, 9. The positions of the two rotors 7, 9 relative to each other are not changed when the actuators 14 are adjusted.

Preferably, the drone 1 also has a third and/or a fourth actuator. Another term for an actuator is actor.

The relevant connection between the actuators and the rotor unit is in each case a mechanical connection that is capable of transmitting forces. The actuators are, in particular, electrically operated mechanical control units and are comparable to so-called servos used in model aircraft. The first and second actuators 14 can each be used to adjust the distance or the local distance between the head side 6 of the body 2 and the rotor unit 3. The two actuators 14 are each arranged close to an edge area or close to the lateral surface 4 or spaced from a center point of the head side 6 or the rotational axis 11. A change in the local distances by at least one of the two actuators 14 therefore causes a change in an angle between the body 2 and the rotor unit 3. This changes the position of the center of gravity with respect to the rotor unit 3, which leads to a change in position or a so-called tilting of the entire drone 1. This allows the movement of the drone 1 to be controlled in a targeted manner. As a result, the drone 1 not only hovers but also moves in flight. This also makes it possible to compensate for vibrations or stabilize it.

Figure 2:
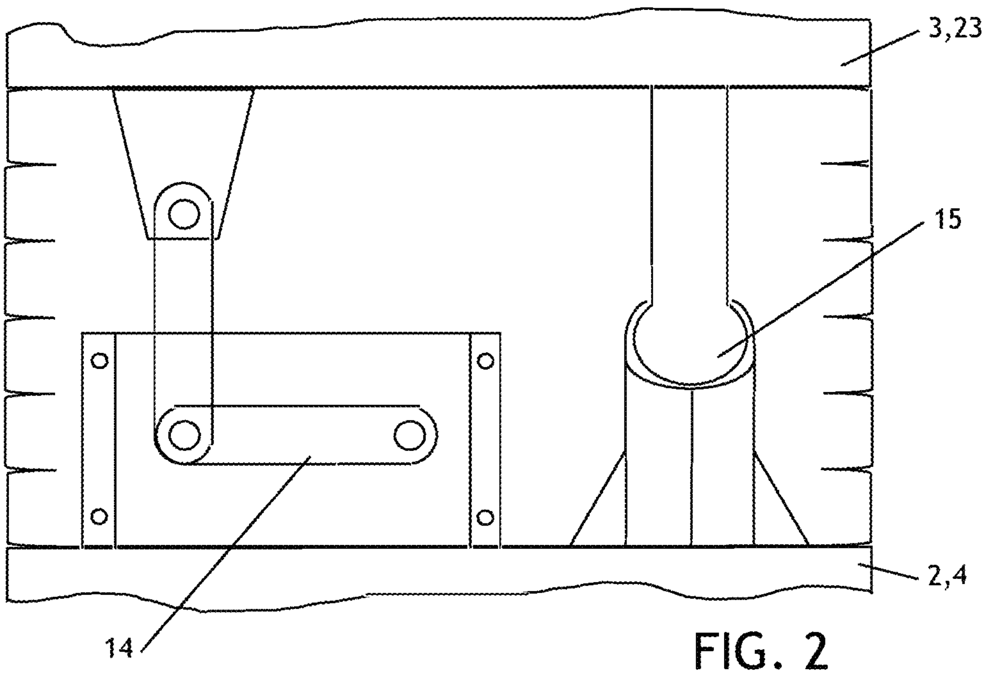
FIG. 2 shows a schematic representation of the connection between the body and the rotor unit of the embodiment according to FIG. 1.

Preferably, there is also at least a third mechanical connection between the rotor unit 3 and the head portion 6. Such a third connection can be formed by a third actuator, for example. Particularly preferably, and as shown in FIG. 2, the rotor unit 3 is also mechanically connected to the head side 6 by means of at least one first spherical plain bearing 15. This spherical plain bearing 15 can, for example, be designed as a hinge and/or as a hinged bearing. Like the first and second actuators 14, the spherical plain bearing 15 is also spaced from the center of the head side 6 or the rotational axis 11 and is arranged close to the edge region or close to the lateral surface 4.

The spherical plain bearing 15 does not restrict the change of angle between the body 2 and the rotor unit 3 by means of the actuators 14, but simplifies their control, as there is a fixed distance at the spherical plain bearing 15.

The first actuator 14 and the second actuator are connected to the control and regulation unit 16 in terms of circuitry, which means that they can be controlled in a controlled and targeted manner. Preferably, the control and regulation unit 16 is designed to control the first actuator 14 and the second actuator for a predeterminable change and/or control of a position and/or an orientation and/or a direction of movement and/or a type of movement and/or a speed of the drone 1. The control comprises the adjustment or influencing of the actuators 14 for stabilization purposes or for control-related reasons. The type of movement includes at least rotation, longitudinal movement and cornering. This enables stable flight of the drone 1 even outdoors and under the influence of weather and air speed.

It is possible that the drone 1 is only intended and designed for a single, one-off use.

However, according to the preferred first embodiment of the present drone 1, it is intended that it is also designed for a controlled landing. For this purpose, the drone 1 preferably has at least a first support leg 17, a second support leg 18 and a third support leg. Three legs 17, 18 have the advantage of a stable stand. Nevertheless, four or five legs can also be provided.

The support legs 17, 18 can be fastened to different parts or regions of the drone 1, wherein different types of fastening or mounting are also possible, in particular also a rigid or fixed fastening. It is preferable that the first support leg 17, the second support leg 18 and the third support leg are each tiltably mounted on the body 2 in the region of the underside 13. This ensures a stable position on the ground. During flight, the support legs 17, 18 are angled in the direction of flight or "upwards". For this arrangement, it is preferable that the lateral surface 4 has a first receiving opening 19 for receiving the first support leg 17, a second receiving opening 20 for receiving the second support leg 18 and a third receiving opening for receiving the third support leg. The first support leg 17 is tiltably mounted at an end portion of the first receiving opening 19. This end portion and the corresponding mounting are arranged next to the underside 13 of the body 2. Accordingly, the second support leg 18 is tiltably mounted on an end portion of the second receiving opening 20 facing the underside 13. Furthermore, the third support leg is also tiltably mounted on an end portion of the third receiving opening facing the underside 13. This type of arrangement allows both the air resistance during flight to be kept low and the length of the support legs 17, 18 to be used effectively.

The preferred type of positioning of the support legs 17, 18 described above also supports their unfolding in flight. This preferably does not require the opening of position flaps or the like. Instead, it is preferred that the control and regulation unit 16—for unfolding the support legs 17, 18, which are folded into the receiving openings—is designed to control the first rotor 7 and the second rotor 9 in such a way that the body 2 performs a predeterminable rotation. Due to the two rotors 7 and 9 rotating at different speeds, the body 2 or the drone 1 can be made to rotate in a controlled manner. The centrifugal forces thereby generated release the support legs 17, 18 from their preloaded position in the receiving openings 19, 20. As soon as these have been partially released from the receiving openings 19, 20, the rotation of the drone 1 can be reduced again in order to allow or support the support legs 17, 18 to sink under the effect of gravity. Preferably, the connecting elements between the support legs 17, 18 and the body have locking bolts which engage in corresponding receiving openings on the support legs 17, 18 as soon as these have lowered sufficiently. Preferably, the legs 17, 18 fixed in position in this way can only be tilted or moved back into the receiving openings 19, 20 by manually releasing the locking mechanism. The drone therefore preferably has no motorized retraction device or swivel-in device for the support legs 17, 18.

The main applications of the drone in question are the creation of aerial photographs of selected areas or so-called reconnaissance, as well as the performance of measurements of chemical and/or physical and/or biological factors or measured variables. The preferred embodiments of the drone 1 therefore have at least one sensor.

According to the first preferred embodiment, the at least one sensor is designed as an optical detection device 12, in particular as a moving image camera or video camera. In a preferred further development of the first preferred embodiment, the drone 1 has a predeterminable plurality of video cameras. In particular, two, three, four, five, six, seven or eight video cameras are provided, which can be fastened at partially different positions of the drone or are integrated into the drone and can have different viewing directions.

According to a second preferred embodiment, the at least one sensor is designed as a seismic sensor. Such a sensor can become effective when the drone penetrates the ground during landing. This allows the drone to be used for scientific measurements. However, it can also be used to monitor movements of objects or bodies that generate vibrations in the ground, in particular heavy off-road vehicles such as armored transport vehicles or battle tanks. According to a third preferred embodiment, the at least one sensor is designed as an acoustic sensor. Many different living creatures or processes in nature generate pressure differences in the air, which are perceived as noise or sound. Acoustic recordings can be helpful for researching or monitoring them.

According to a fourth preferred embodiment, the at least one sensor is designed as an infrared sensor. The measurement or detection of heat-emitting areas can be helpful in many different areas of application, such as observing nature or searching for and locating a leak in a factory.

According to a fifth preferred embodiment, the at least one sensor is designed as a chemical sensor. This allows, for example, a soil or agricultural soil to be checked.

According to a sixth preferred embodiment, the at least one sensor is designed as an environmental sensor. This includes all types of sensors for measuring environmental factors, in particular temperature, air pressure and/or pH value.

Depending on their design, the sensor or sensors can be arranged on different regions of the drone 1. It is particularly preferred that the sensor is arranged in the region of an underside 13 of the body 2 and/or the outer lateral surface 4.

It is preferable that the drone 1 does not have any complicated and complex multi-dimensional adjustment mechanisms. Instead, it is particularly intended that the position of the sensor, in particular of the optical detection device 12, is primarily controlled by means of the rotor unit 3. Lateral rotations or lateral changes in the orientation of the sensor are preferably carried out via a predeterminable, short-term difference in the rotational speeds of the two rotors 7, 9. The upward or downward movements are preferably carried out in a first step by pivoting the rotor unit 3 relative to the body 2. This makes the sensor and the drone 1 easy to control. In particular when the sensor is preferably designed as at least one video camera 12, it is possible to control only this video camera 12, wherein the control of the drone results from the desired viewing direction of the video camera 12. In this way, the video camera can detect the horizon and the position of the horizon determined in this way can be used for attitude control and/or stabilization. In this way, "optical" control or attitude control can be achieved without the need for a GPS receiver or an inertial navigation system (INS) or a laser gyro for control and/or attitude control.

Compared to the prior art in this field, this flight control and/or attitude control system requires significantly fewer sensors and controls. For example, current drones have multiple controls for this purpose, which separately regulate the position and movement of the drone in the individual degrees of freedom. In addition, the camera orientation is controlled separately.

This control of the sensor or the drone is further supported in particular by the fact that the sensor is pivotably mounted on the body 2 by an angle, preferably by only one angle, in particular an angle of more than 90 degrees. To adjust this angle, an actuator—not shown in the figures—is preferably provided, which is connected to the control and monitoring unit. The restriction to exactly one and only one adjustable angle is advantageous, as this simplifies the mounting of the sensor. This has proven to be particularly advantageous in the design of the at least one sensor as an optical detection device 12. A further, for example lateral, adjustment is not necessary, as the drone 1 itself can be rotated for this purpose.

In addition to—passive—reconnaissance, the drone 1 can also be used for active duties. For these preferred active duties, the drones are intended to carry a load. Such transportation of goods can also be referred to as "cargo".

A first preferred active duty of the drones is the transportation of at least one object or a mixture of substances from a location to a destination or a destination area, wherein the drones are designed accordingly for such transports. Preferably, the objects to be transported comprise medical products, such as medicines, and/or storage media. Preferably, the mixtures of substances comprise fire extinguishers, fertilizers and/or pesticides.

A second preferred active activity of the drones is the targeted generation of radar reflections to suggest a much larger flying object. For this purpose, the drone intended for this purpose carries at least one radar reflector, which is stored in the drone in a packed or folded state and can be folded out or unfolded in a predeterminable manner. The radar reflector preferably comprises a plastic film with an aluminum coating. The radar signal of a specific flying object can be imitated, in particular by selectively forming a swarm of multiple drones 1. In this embodiment, it can also be provided that the at least one radar reflector can be ejected from the drone 1 or retracted back into the drone 1.

A third preferred activity of the drones is to be used directly in combat. In a further development of the invention, it is therefore further preferably provided that the drone 1 comprises at least one weapon system. Preferably, the control and regulation unit 16 for activating and/or triggering the weapon system is connected to it in terms of control technology. Alternatively, however, the weapon system can also be equipped with a purely mechanical ignition unit, such as an impact igniter.

Very different types of weapon systems can be used in the present further development. The two particularly preferred types of weapon systems are listed below. Preferably, the weapon system comprises a shaped charge or shaped charge grenade, and preferably the shaped charge is arranged in the region of the underside 13. This allows the drone 1 to actively engage armored vehicles. Even heavy battle tanks have very little armor on their rear upper side. In the event of a targeted attack on these regions from above, even a heavy battle tank can be sufficiently damaged by a relatively small projectile to render it at least temporarily incapable of fighting.

Another preferred design of the weapon system is that it comprises a fragmentation grenade, which is preferably arranged in the region of the lateral surface 4. This allows non-armored targets to be specifically engaged. It is also possible to detonate such a fragmentation grenade if the drone 1 crashes due to incoming fire. This design of the weapon system is also advantageous if the drone 1 is shot into a building and flies through the individual portions using the rotors 7, 9. In particular, this allows targeted engagement of weapon systems that are in cover and therefore difficult to locate and cannot be hit by targeted direct fire.

The following are principles for understanding and interpreting the present disclosure.

Characteristics are usually introduced with an indefinite article "a, an, of a, of an". Unless the context indicates otherwise, "a, an, of a, of an" is therefore not to be understood as a numeral.

The connective "or" is to be interpreted as inclusive and not exclusive. Unless the context indicates otherwise, "A or B" also comprises "A and B", wherein "A" and "B" represent any characteristics.

By means of an ordering numeral, for example "first", "second" or "third", in particular a feature X or an object Y is distinguished in multiple embodiments, unless this is otherwise defined by the disclosure of the invention. In particular, a feature X or object Y with an ordering numeral in a claim does not mean that an embodiment of the invention falling within that claim must have a further feature X or a further object Y.

A "substantially" in connection with a numerical value includes a tolerance of ±10% around the specified numerical value, unless otherwise apparent from the context.

In the case of value ranges, the end values are included unless the context indicates otherwise.

The invention claimed is:

1. A drone comprising:
a body; and
a rotor unit;
wherein the body has a substantially cylindrical outer lateral surface;
wherein at least one energy storage element of the drone is arranged in the body;
wherein the rotor unit is connected to a head side of the body;
wherein the rotor unit comprises a first rotor with first blades and a second rotor with second blades;
wherein the first rotor and the second rotor are arranged coaxially to each other;
wherein the first rotor is designed to rotate clockwise about a rotational axis;
wherein the second rotor is designed to rotate counterclockwise about the rotational axis;
wherein the first blades and the second blades are mounted so that they can be freely folded, and when folded the first blades and the second blades rest against the body in a rotation-free state;
wherein a connection of the rotor unit to the head side of the body is configured without a swashplate;
wherein the rotor unit is connected to the head side by at least a first actuator and a second actuator;
wherein the rotor unit is mechanically connected to the head side by one first spherical plain bearing;
wherein a local distance between the head side and the rotor unit is configured to be adjusted by the first actuator and the second actuator, a first change in the local distance by at least one of the first and second actuators causing a second change in an angle between the head side and the rotor unit; and
wherein the first actuator and the second actuator are each spaced apart from a center point of the head side or the axis of rotation, and the first spherical plain bearing is arranged spaced apart from the center point of the head side or the axis of rotation.

2. The drone according to claim 1, wherein the body has a substantially circular cross-section.

3. The drone according to claim 1, wherein the drone has at least one sensor.

4. The drone according to claim 3, wherein the sensor is mounted on the body so as to be pivotable by an angle.

5. The drone according to claim 1, wherein:
the drone comprises a control and regulation unit; and
the first actuator and the second actuator are connected to the control and regulation unit in terms of circuitry.

6. The drone according to claim 1, wherein the control and regulation unit is configured to control the first actuator and the second actuator.

7. The drone according to claim 1, wherein the drone comprises at least a first support leg, a second support leg, and a third support leg.

8. The drone according to claim 7, wherein the first support leg, the second support leg, and the third support leg are each tiltably mounted on the body in a region of an underside.

9. The drone according to claim 8, wherein a control and regulation unit for unfolding the support legs is configured to control the first rotor and the second rotor so that the body performs a predeterminable rotation.

10. The drone according to claim 7, wherein:
the lateral surface comprises:
a first receiving opening for receiving the first support leg;
a second receiving opening for receiving the second support leg; and
a third receiving opening for receiving the third support leg; and
the first support leg is tiltably mounted on an end portion of the first receiving opening facing the underside;
the second support leg is tiltably mounted on an end portion of the second receiving opening facing the underside; and
the third support leg is tiltably mounted on an end portion of the third receiving opening facing the underside.

11. The drone according to claim 1, wherein the drone comprises at least one weapon system.

12. The drone according to claim 11, wherein the weapon system comprises a shaped charge.

13. The drone according to claim 11, wherein the weapon system comprises a fragmentation grenade.

* * * * *